(12) United States Patent
Nikkel et al.

(10) Patent No.: US 7,508,040 B2
(45) Date of Patent: Mar. 24, 2009

(54) MICRO ELECTRICAL MECHANICAL SYSTEMS PRESSURE SENSOR

(75) Inventors: Eric L. Nikkel, Corvallis, OR (US); Jeremy H Donaldson, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 47 days.

(21) Appl. No.: 11/422,243

(22) Filed: Jun. 5, 2006

(65) Prior Publication Data

US 2007/0277616 A1    Dec. 6, 2007

(51) Int. Cl.
*H01L 29/78* (2006.01)

(52) U.S. Cl. .................. 257/414; 73/715; 73/721

(58) Field of Classification Search .......... 257/414; 73/715, 718, 719, 720, 721, 722, 727
See application file for complete search history.

(56) References Cited

U.S. PATENT DOCUMENTS

| | | | |
|---|---|---|---|
| 5,146,787 A | 9/1992 | Thomas | |
| 5,209,121 A | 5/1993 | Haefner | |
| 6,604,425 B1 | 8/2003 | Hsu | |
| 6,612,178 B1 | 9/2003 | Kurtz | |
| 6,655,216 B1 | 12/2003 | Aizawa | |
| 6,688,169 B2 | 2/2004 | Choe et al. | |
| 6,816,301 B1 | 11/2004 | Schiller | |
| 6,857,312 B2 | 2/2005 | Choe et al. | |
| 2002/0191802 A1 | 12/2002 | Choe et al. | |
| 2004/0091125 A1 | 5/2004 | Choe et al. | |
| 2004/0168519 A1* | 9/2004 | Kalvensten et al. | 73/727 |
| 2005/0157305 A1 | 7/2005 | Yu et al. | |
| 2006/0063354 A1 | 3/2006 | Fortin et al. | |
| 2006/0137457 A1* | 6/2006 | Zdeblick | 73/715 |
| 2006/0144153 A1 | 7/2006 | Brosh | |

FOREIGN PATENT DOCUMENTS

| | | |
|---|---|---|
| EP | 1561724 A1 | 8/2005 |
| WO | WO 01/056069 A1 | 8/2001 |
| WO | WO 02/104067 A2 | 12/2002 |
| WO | 2005/058133 A | 6/2005 |

OTHER PUBLICATIONS

Hideyuki Funaki, Yujiro Naruse, Kazuhiro Suzuki; MEMS Optical Microphone with Electrostatically Controlled Grating Diaphragm; Journal; Apr. 1, 2006; 17-4; Elsevier (Abstract Only).

J. Akhtar, B.B. Dixit, B.D. Pant, V.P. Deshwal; Polysilicon Piezoresistive Pressure Sensors Based on MEMS Technology; Journal; Nov.-Dec. 2003; 49-6 (Abstract Only).

* cited by examiner

*Primary Examiner*—Evan Pert
*Assistant Examiner*—Tan N Tran (57) ABSTRACT

A micro electrical mechanical system (MEMS) pressure sensor includes a base structure defining an opening, a plurality of support members coupled to the base structure, a thin-film diaphragm supported by the support members, and at least one strain-sensitive member associated with the at least one support member.

21 Claims, 8 Drawing Sheets

FIG. 8B

MICRO ELECTRICAL MECHANICAL SYSTEMS PRESSURE SENSOR

BACKGROUND

MEMS devices are a combination of micro mechanical and micro electronic systems that are revolutionizing nearly every product category by bringing together these systems. A MEMS device typically includes a movable micro mechanical structure and silicon based microelectronics. One type of known MEMS device is a MEMS transducer. Capacitive MEMS transducers may be used in an air-bag system for crash detection. For example, a crash is detected by monitoring the movement of the mechanical structure in the MEMS transducer using associated microelectronics in the MEMS transducer. The mechanical structure in the transducer often includes a dynamic capacitive plate which is positioned relative to a fixed capacitive plate. The capacitance between the capacitive plates depends, at least in part, on the distance there between. As the dynamic capacitive plate is displaced, a change in capacitance is caused by the relative change of the dynamic capacitive plate relative to the fixed capacitive plate. This change in capacitance is detected by the microelectronics. If the change is sufficiently large and/or abrupt, the microelectronic activate the air bag.

Micro electrical mechanical systems (MEMS) can also be used to create pressure sensors that are small and sensitive. These sensors have traditionally been used in aircraft testing, fluid mechanics experiments, sensor arrays, hearing aids, and other applications where small sensors of pressure or vibration are desired.

MEMS transducers are frequently manufactured from a single wafer. The mechanical structure of these transducers is created by depositing a poly-silicon layer on a silicon wafer, which is typically only a few microns thick. Many existing MEMS pressure sensors require integration with CMOS circuitry or require complex manufacturing techniques such as bonding multiple substrates. Complex manufacturing techniques require expensive machinery and materials and potentially lower the yield of functional devices.

MEMS pressure sensors have also been manufactured using piezoresistors attached to a diaphragm. Piezoresistors are inexpensive to manufacture and can be built with standard silicon wafer processing. However, the sensitivity of these devices is limited by the small amounts of strain generated by MEMS diaphragms.

SUMMARY

A micro electrical mechanical system (MEMS) pressure sensor includes a base structure defining an opening, a plurality of support members coupled to the base structure, a thin-film diaphragm supported by the support members, and at least one strain-sensitive member associated with at least one support member.

BRIEF DESCRIPTION OF THE DRAWINGS

The accompanying drawings illustrate various embodiments of the present exemplary system and method and are a part of the specification. The illustrated embodiments are merely examples of the present exemplary system and method and do not limit the scope thereof.

Throughout the drawings, identical reference numbers designate similar, but not necessarily identical, members.

DETAILED DESCRIPTION

The present specification details a MEMS pressure sensor with enhanced sensitivity. Sensing members, measuring at least one of a variety of strain-related effects, are placed at locations where high strains are developed, such as on or in a support member or adjacent to an opening in a substrate. Specifically, according to one exemplary embodiment, sensing members near a discontinuity in a structure or a flexible member experience magnified stress and consequently magnified strain compared to strain generated on a diaphragm. As a diaphragm is excited by an applied pressure, motion of a relatively large diaphragm is transmitted to a much smaller flexible member. The resulting increase in strain, localized at points of strain measurement, allow higher sensitivity pressure sensors. Further details of various exemplary systems and methods will be provided with reference to the figures below.

As used in the present specification and in the appended claims, the term "micro electrical mechanical system (MEMS)" is meant to be understood broadly as including any microscopic device with both electrical and mechanical functionality that is manufactured in a batch process.

As used in the present specification and in the appended claims, the term "adjacent" is defined to include any spatial arrangement where a first member is near, next to, close to, or proximate to a second member or feature, but not necessarily touching a second member or feature.

In the following description, for purposes of explanation, numerous specific details are set forth in order to provide a thorough understanding of the present MEMS pressure sensor systems and methods. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
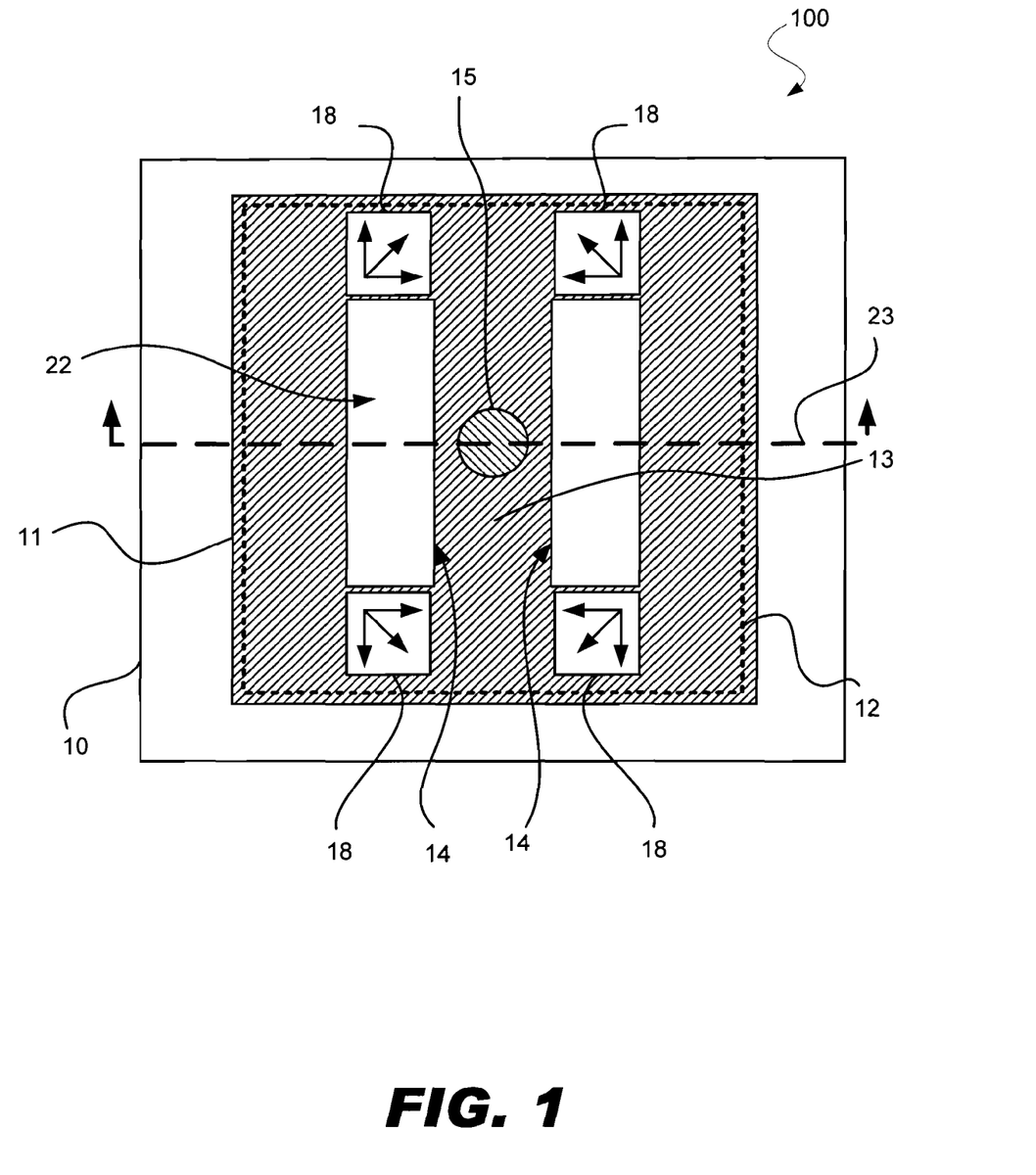
FIG. 1 is a schematic aerial view illustrating an increased sensitivity MEMS pressure sensor, according to one exemplary embodiment.

FIG. 1 illustrates an aerial view of a micro-electro mechanical system (MEMS) pressure sensor configuration (100) employing strain-sensitive members at locations of high stress, according to one exemplary embodiment. As illustrated in FIG. 1, the exemplary pressure sensor configuration includes a base substrate (10) and at least one thin film substrate (11) formed on the base substrate. As illustrated in FIG. 1, the thin film substrate (11) defines at least one opening (14) and a cavity (22) is formed in the base substrate (10). Additionally, a flexible support member (13) is formed between the openings (14). A diaphragm member (12) is attached to the substrate (10) or thin film substrate (11). Further, as illustrated in FIG. 1, strain-sensitive members (18) are located on or adjacent to the flexible support member (13) and/or adjacent to an opening (14). Further details of each component of the exemplary pressure sensor configuration of FIG. 1 are provided below.

As mentioned previously, the substrate (10) forms a base structure for the present exemplary pressure sensor configuration. The substrate (10) is a substantially rigid material that can structurally support additional features of the system and define features such as openings, gaps, and channels. Particularly, the substrate (10) may be a single crystal structure or a poly crystalline structure material. According to one exemplary embodiment, a variety of substrates (10) may be used to practice the present configuration including, but not limited to, silicon, germanium, gallium arsenide, other semiconductor materials, and non-semiconductor materials such as glass or aluminum oxide.

Continuing with FIG. 1, at least one thin film substrate (11) is bonded to the surface of the substrate (10). While at least one thin film substrate (11) is permanent, one or more thin film substrate (11) layers may also act as a mask used to etch the substrate (10). At least one opening (14) is made through the thin film substrate (11), and a cavity (22) is defined in the substrate (10) underneath the thin film substrate (11). According to the exemplary embodiment of FIG. 1, the thin film substrate (11) is shaped such that a portion between the openings (14) forms at least one flexible support member (13). The flexible support member (13) may include a portion of the thin film substrate (11), the substrate (10), and/or any additional layers. The portion of the substrate (10) below the flexible support member (13) is removed so that the flexible support member (13) is not attached to the substrate (10) except at the extremities of the flexible support member (13). The cavity (22) in the substrate (10) may also extend beyond the edges of the openings (14).

A diaphragm (12), represented in FIG. 1 by a dashed rectangle, is supported a first distance from the thin film substrate (11). According to the present exemplary system and method, the diaphragm (12) is a substantially flat layer of material sufficiently flexible to bend and generate substantial strain in response to an imparted force. Although the present exemplary system and method is described in the context of a diaphragm (12) that is substantially rectangular, additional embodiments may employ diaphragms (12) of other geometries, including, but in no way limited to, circles, triangles, polygons, or substantially symmetrical, asymmetrical, or other shapes. The surface area of the diaphragm (12) may be similar to or substantially larger than the openings (14) in the thin film substrate (11).

Perimeter support members (28) affix the diaphragm (12) on or near the edge of the thin film substrate (11). As illustrated, the perimeter support members (28) may extend across each edge of the diaphragm (12), attaching the entire perimeter of the diaphragm (12) to the substrate (10) or thin film substrate (11), according to one exemplary embodiment. Alternately, a plurality of perimeter support members (28) may be distributed along the perimeter of the diaphragm (12), including corners if any, such that the edges of the diaphragm (12) are not affixed to the substrate (10) or thin film substrate (11) at all points.

Figure 2:
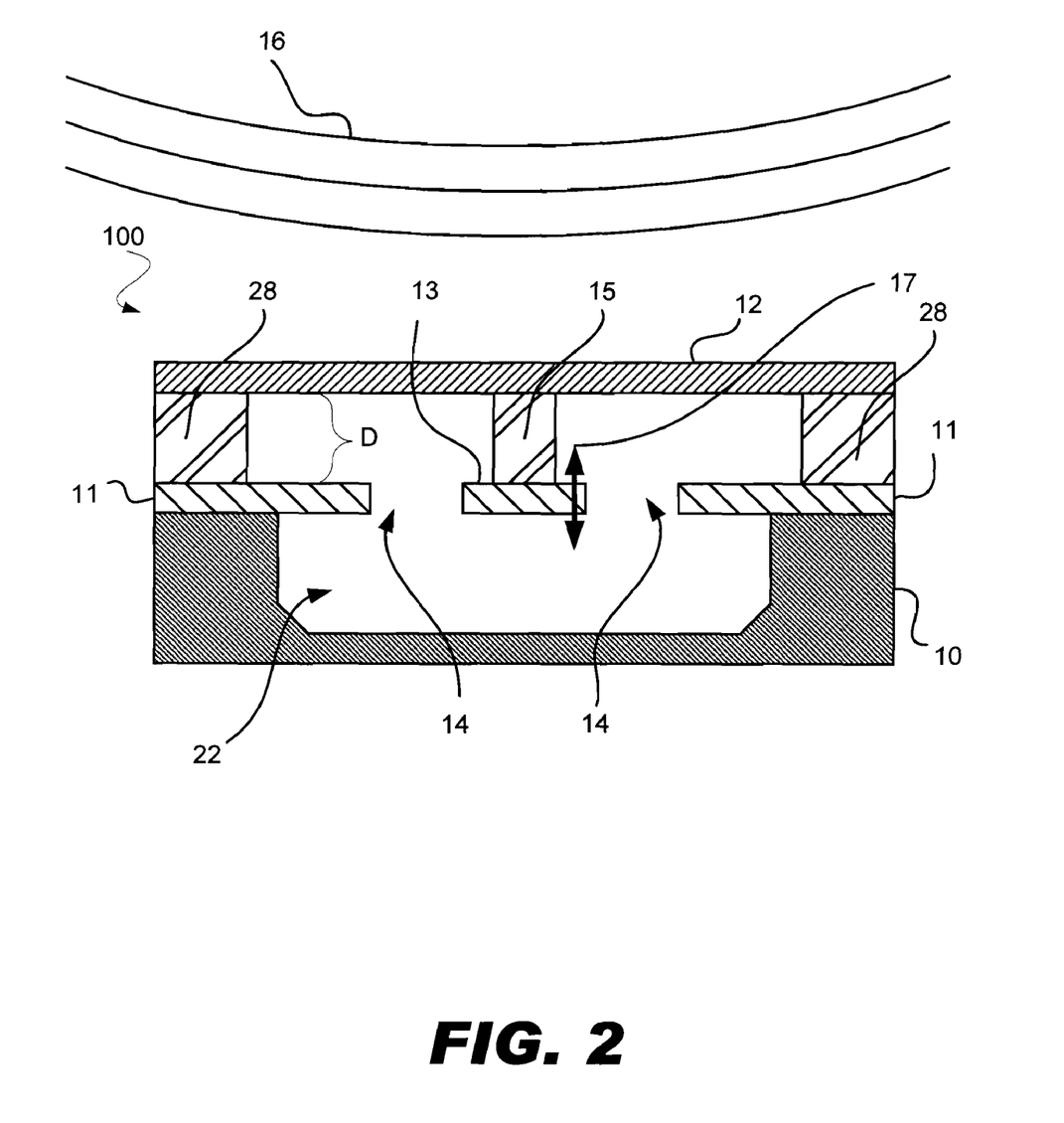
FIG. 2 is a schematic cross-sectional view illustrating an increased sensitivity MEMS pressure sensor, according to one exemplary embodiment.

As illustrated in FIG. 2, perimeter support members (28) at the edges of the thin film substrate (11) suspend the diaphragm (12) a first distance (D) above the thin film substrate (11). According to the exemplary embodiment of FIG. 2, the diaphragm (12) is supported in a plane above and substantially parallel to the thin film substrate (11). Additional exemplary embodiments may support the diaphragm (12) so that the diaphragm (12) is supported at a first angle from the surface of the thin film substrate (11) such that the diaphragm (12) and thin film substrate (11) are not parallel.

Returning again to FIG. 1, at least one motion translation support member (15) couples at least one point on the diaphragm (12) to at least one point on the flexible support member (13). As illustrated in the exemplary embodiment of FIG. 1, the flexible support member (13) is coupled to a substantially central point on the diaphragm (12) by a motion translation support member (15).

During operation, as external forces flex the diaphragm (12), the forces are transmitted through a motion translation support member (15) to a flexible support member (13), which also experiences motion. Strain experienced by the flexible support member (13) is concentrated at the edges of the openings (14) and the ends of the flexible support member (13).

Consequently, as illustrated in FIG. 1, one or more strain-sensitive members (18) are located on or adjacent to the flexible support member (13) and/or adjacent to an opening (14). The embodiment of FIG. 1 illustrates that the one or more strain-sensitive members (18) may include, but are in no way limited to, strain gauges that are located adjacent to both the openings (14) and a flexible support member (13). Additional embodiments may include strain-sensitive members coupled to at least one flexible support member (13) or integrated in at least one flexible support member (13).

Strain developed across the relatively large diaphragm (12) will be transmitted and concentrated at the edges of the much smaller flexible support member (13) and in the flexible support member (13). The strategic positioning of the strain-sensitive members (18) on or adjacent to the flexible support member (13) and/or adjacent to an opening (14) allows the system to detect small movements of the diaphragm (12). In one exemplary embodiment, these strain-sensitive members (18) are positioned to detect strain in a variety of directions, as indicated by the arrows on the strain-sensitive members (18).

As the diaphragm (12) and flexible support member (13) experience strain, the strain-sensitive members (18) generate an electrical signal corresponding to the degree of strain experienced. A variety of strain-sensitive members (18) may be incorporated on or adjacent to the flexible support member (13) and/or adjacent to an opening (14). Specifically, the strain-sensitive members (18) may be configured to measure any number of strain related effects including, but in no way limited to, measuring electromagnetic, electrostrictive, thermoelectric, piezoelectric, piezoresistive, optoelectric, optical, capacitive, or other strain-related effects including variations in transconductance, electric fields, and/or charge carrier mobility.

Figure 3:
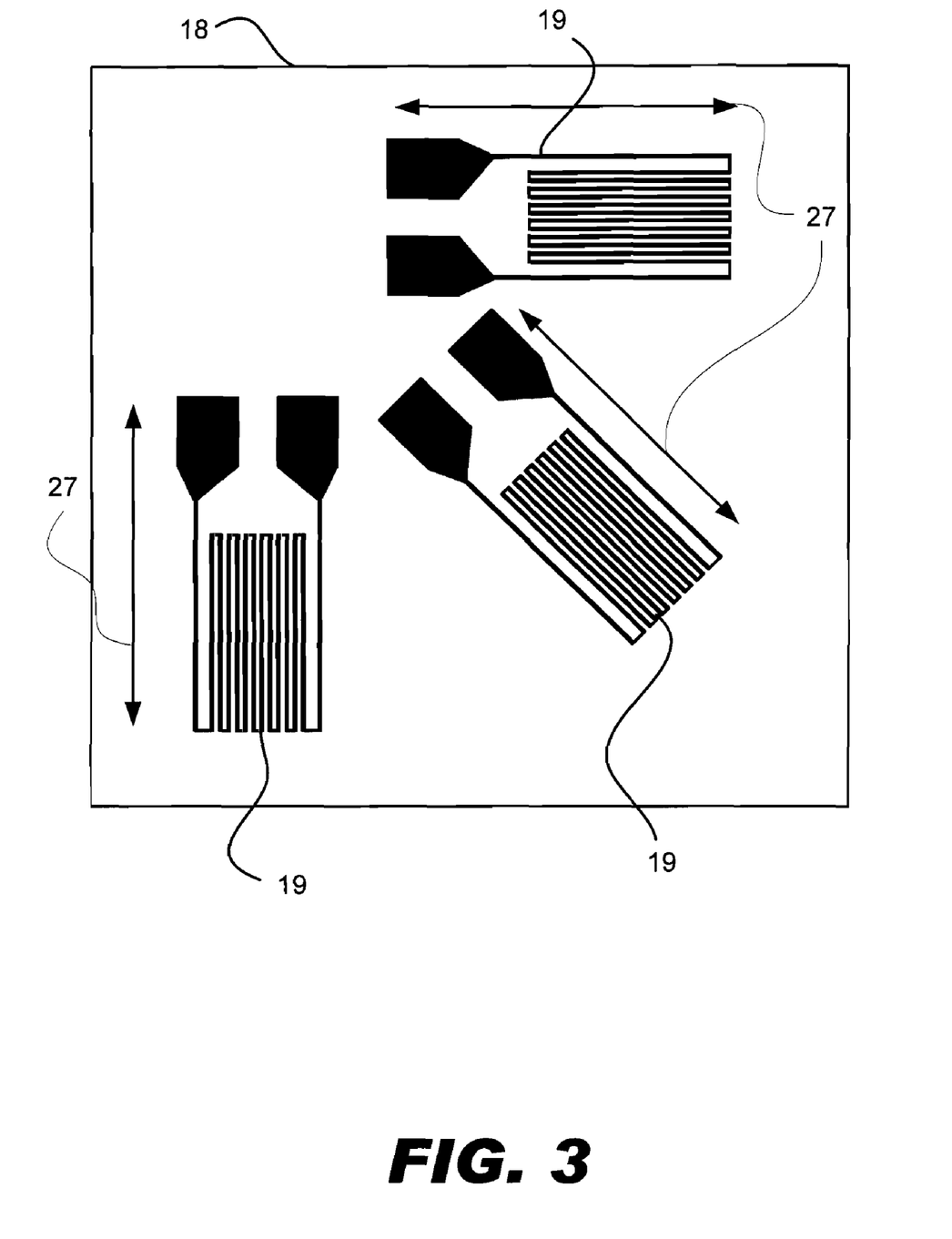
FIG. 3 is a schematic view of a strain gauge used to increase sensitivity of a MEMS pressure sensor, according to one exemplary embodiment.

One exemplary embodiment employs piezoresistive strain gauges similar to the one depicted in FIG. 3 as strain-sensitive members (18). Where piezoresistive strain gauges are employed, a bias voltage may set a nominal output voltage value. As the strain on at least one piezoresistor changes, the electrical resistance of at least one piezoresistor changes accordingly, effectively changing the output voltage signal.

Figure 6:
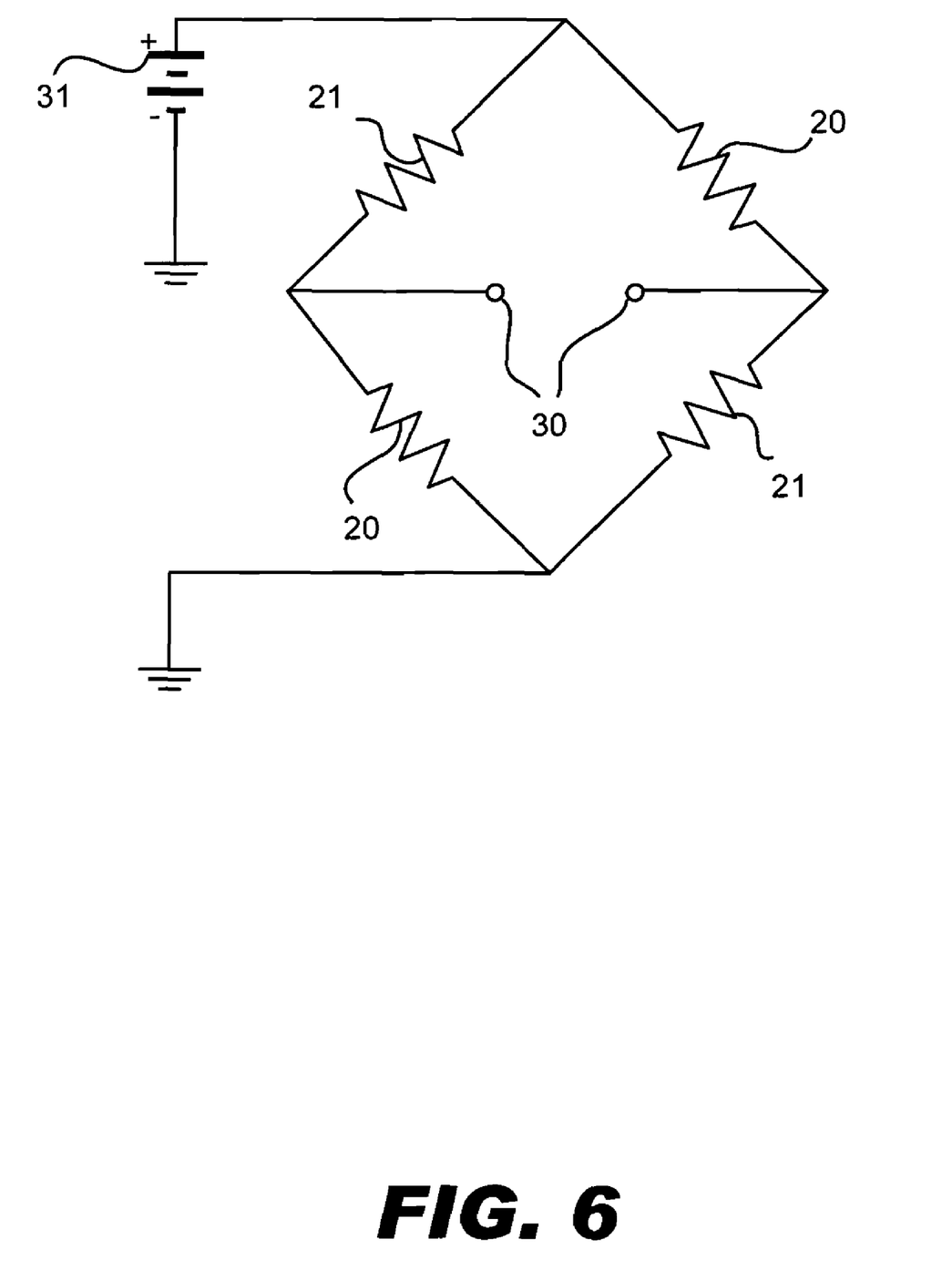
FIG. 6 is a schematic diagram illustrating a measuring circuit for enhancing the sensitivity of a MEMS pressure sensor, according to one exemplary embodiment.

Strain gauges may also be configured in a Wheatstone bridge configuration, as illustrated in the measuring circuit of FIG. 6, to further increase the sensitivity reflected at the output.

As shown in FIG. 3, a rosette piezoresistive strain gauge may be used in the present MEMS pressure sensor configuration (100), according to one exemplary embodiment. As depicted in FIG. 3, an exemplary strain gauge (18) may include one or more piezoresistors (19). The piezoresistors (19) may include single crystal silicon, poly silicon, or other materials. The embodiment illustrated in FIG. 3 includes three piezoresistive devices (19); one piezoresistor (19) being oriented substantially perpendicular relative to a second piezoresistor (19), with a third piezoresistor (19) substantially bisecting the angle between the first and second piezoresistors (19).

As illustrated, each exemplary piezoresistor (19) detects strain along its longitudinal axis, as indicated by arrows (27) denoting of strain sensitivity of each piezoresistor (19). Together, multiple orientations of piezoresistors (19) can detect strain in multiple directions.

According to one exemplary embodiment, the piezoresistors (19) may be bonded to the surface of the MEMS pressure sensor configuration (100), diffused into the substrate (10; FIG. 2), or incorporated into any layer of the device. Electrical connections to the piezoresistors (19) may be made in a variety of configurations including, but in no way limited to, connecting the piezoresistors together in series or connecting each piezoresistor (19) individually to at least one measurement circuit.

Another exemplary embodiment of the present MEMS pressure sensor configuration employs a strain-sensitive member (18) that measures the reflection of light incident to a flexible support member (13). Particularly, strain on a related support member (13) would be manifest as a change in reflection angle of the light incident to the flexible support member. A change in reflection angle due to strain on the flexible support member (13) may then be measured to detect incident pressure on the device.

In another exemplary embodiment, a semiconductor device, including, but not limited to, a transistor or diode is located on, in, or near a flexible support member (13) and at least one property of the semiconductor device is measured to indicate a change in strain in the vicinity of the device.

As mentioned, FIG. 2 illustrates a cross-section of a MEMS pressure sensor, according to one exemplary embodiment. The cross-sectional view of FIG. 2 illustrates a cross-section of the MEMS pressure sensor (100) of FIG. 1 along the dashed line (23; FIG. 1).

As shown in FIG. 2, a portion of the substrate (10) is removed beneath the thin film substrate (11) to create a cavity (22). Sections of the thin film substrate (11) are also removed to create openings (14). The flexible support member (13) is not bonded to the substrate except at connection points at the extremities of the flexible support member. Further, the flexible support member (13) is sufficiently thin and elastic to bend when force is applied through the motion translation support member (15).

During operation, pressure waves (16) incident to the diaphragm (12) cause displacement of the diaphragm (12). The created displacement is then transmitted through a motion translation support member (15) to the flexible support member (13). The pressure waves (16) acting upon the exemplary MEMS pressure sensor configuration (100) may be transmitted to the diaphragm (12) from any number of sources including, but in no way limited to, sound waves or other compressive waves propagating in the air or another gas, vibrations propagating through water, or any number of vibrations being transmitted through a solid medium.

While the exemplary MEMS pressure sensor configuration (100) described herein may be used in any number of pressure sensing applications, according to one exemplary embodiment, the present exemplary MEMS pressure sensor configuration is used in a microphone application. Specifically, according to one exemplary embodiment, the MEMS pressure sensor configuration (100) described herein provides increased sensitivity to sound waves when compared to traditional pressure sensor configurations.

According to the exemplary configuration illustrated in FIG. 2, the direction of deflection of the flexible support member (13) and the diaphragm (12) is substantially perpendicular to the substrate (10) as indicated by an arrow (17). By placing strain-sensitive members (18) in positions of high stress, such as near the junction between the flexible support member (13) and the substrate (10) as illustrated in FIG. 1, the strain-sensitive members (18) experience strain which is magnified compared to the strain at the edges of the diaphragm (12). Magnified strain on the strain-sensitive members (18) increases the sensitivity of the resulting MEMS pressure sensor configuration (100) when compared to traditional configurations.

Formation of a strain gage on a substrate is known in the art. Specifically, U.S. Pat. No. 6,739,199 describes a method of forming a substrate for a MEMS device with a strain gage.

As explained above, the illustrated exemplary strain gauge (18) is depicted for exemplary purposes only, and does not in any way limit the scope of strain-sensitive devices (18) that may be used to practice the present exemplary device. Additionally, the details provided above are in no way meant to limit the various uses of the present exemplary MEMS pressure sensitive configuration (100).

Figure 4:
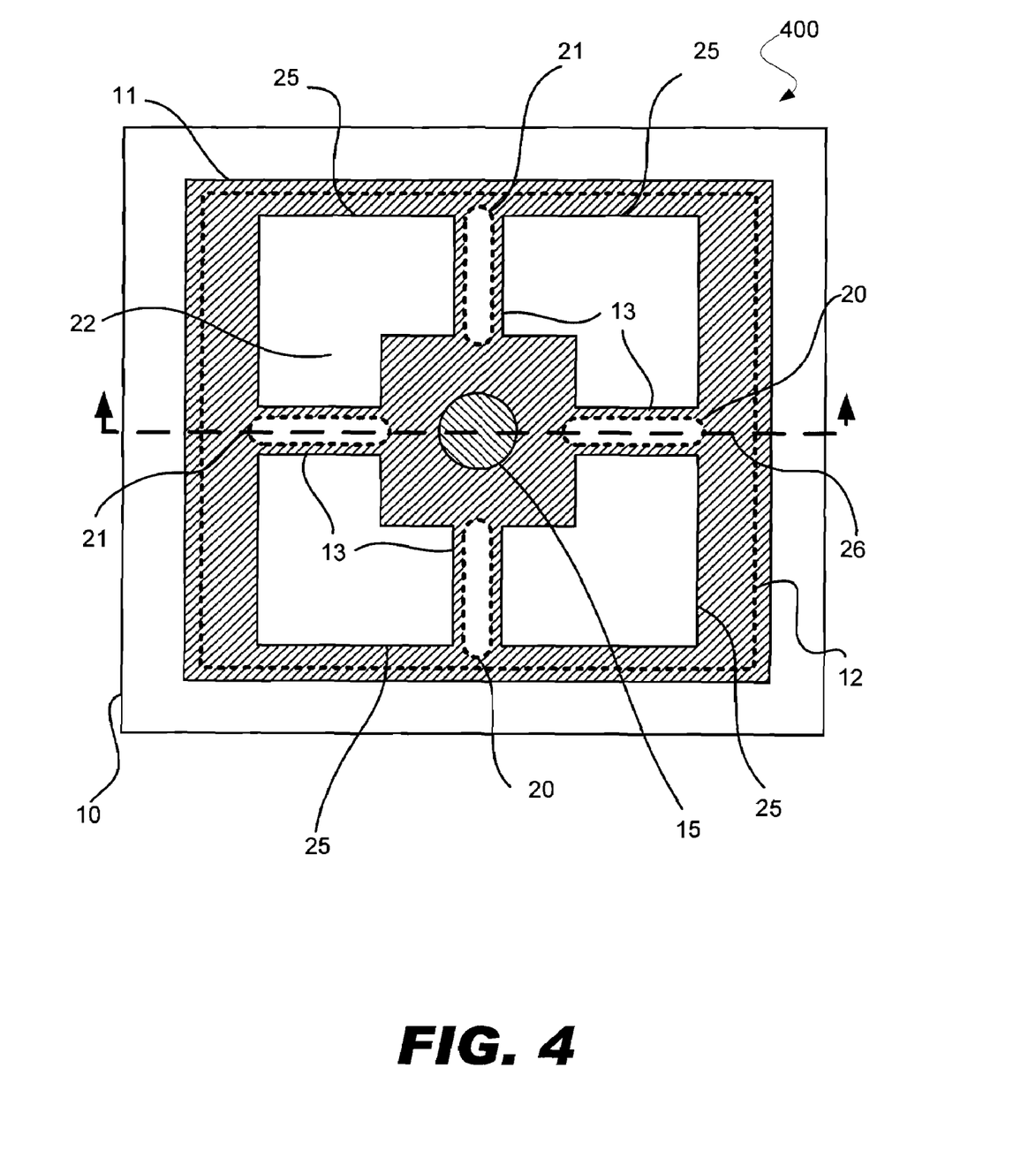
FIG. 4 is a schematic aerial view illustrating an increased sensitivity MEMS pressure sensor incorporating diffused piezoresistors, according to one exemplary embodiment.

As mentioned above, the pressure sensing components of the exemplary MEMS pressure sensitive configuration (100) may be disposed thereon in any number of ways. By way of example, FIG. 4 illustrates an aerial view of a MEMS pressure sensor (400) incorporating diffused piezoresistors, according to one exemplary embodiment. According to the exemplary embodiment illustrated in FIG. 4, at least one diffused piezoresistor (20, 21) is integrated in a substrate (10). The piezoresistors diffused in the exemplary MEMS pressure sensitive configuration (400) may include n-type piezoresistors (20) and/or p-type piezoresistors (21). In one particular exemplary embodiment, the MEMS pressure sensitive configuration (400) includes a plurality of diffused piezoresistors (20, 21) including two n-type piezoresistors (20) and two p-type piezoresistors (21). The diffused piezoresistors (20, 21) in the present exemplary embodiment may be exemplary strain-sensitive members (18; FIG. 1) which may be replaced with other strain-sensitive members in other embodiments.

As illustrated in FIG. 4, a thin film substrate (11) is coupled to the substrate (10). Sections of the thin film substrate (11) are removed to define gaps (25), leaving flexible support members (13) connecting the edges of the thin film substrate (11) to the center of the device. In one exemplary embodiment, four gaps (25) are created in the thin film substrate (11) to define four flexible support members (13). However, alternative exemplary embodiments may include fewer or additional gaps (25) and fewer or additional flexible support members (13), depending on the desired use and situation.

A portion of the substrate (10) is also removed to create a cavity (22) beneath the center of the MEMS pressure sensitive configuration (400). Specifically, the cavity (22) is disposed below the flexible support members (13) and the thin film gaps (25). The flexible support members (13) retain a portion of the underlying substrate (10) sufficient to allow any diffused piezoresistors (20, 21) to be incorporated into the flexible support members (13). While it is advantageous for each flexible support member (13) to include a piezoresistor in some embodiments, the present exemplary system and method is in no way limited to including exactly one piezoresistor (20, 21) for each flexible support member (13). Furthermore, some flexible support members (13) may not include any piezoresistors (20, 21) and some flexible support members (13) may include multiple piezoresistors (20, 21).

Figure 5:
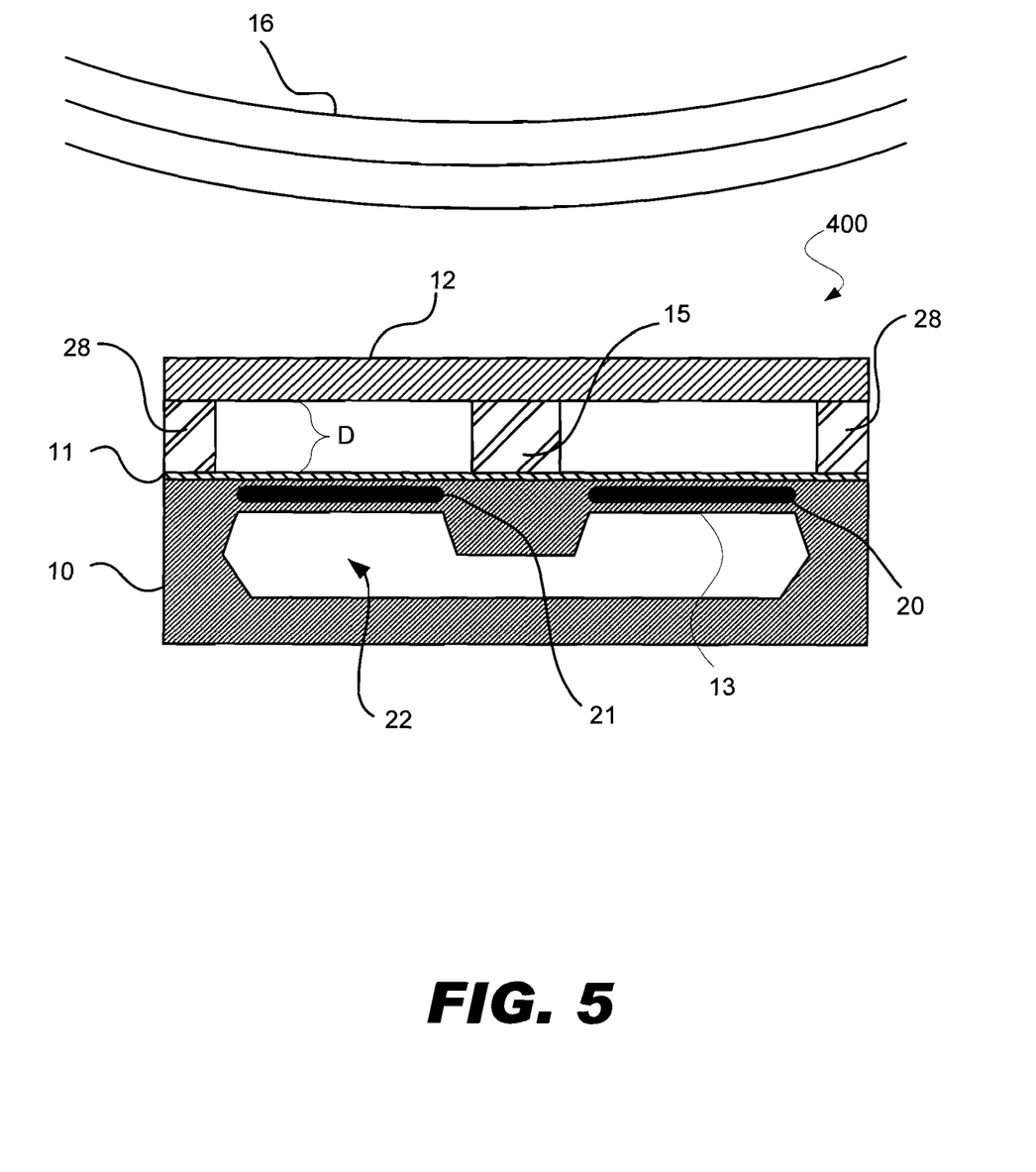
FIG. 5 is a schematic cross-sectional view further illustrating an increased sensitivity MEMS pressure sensor incorporating diffused piezoresistors, according to one exemplary embodiment.

A diaphragm (12), represented in FIG. 4 by a dashed rectangle, is supported a first distance (D) from the thin film substrate (11) as illustrated in FIG. 5. Similar to the embodiment of FIG. 2, the diaphragm (12) of the embodiments of FIGS. 4 and 5 is supported above and substantially parallel to the substrate (10) and thin film substrate (11). The diaphragm (12) is a substantially flat layer flexible enough to bend and generate substantial strain in response to an imparted force.

According to the exemplary embodiment of FIGS. 4 and 5, a motion translation support (15) attaches a diaphragm (12) to the junction of the support members (13). Additional perimeter supports (28; FIG.5) may affix the edges of the diaphragm (12) to the thin film substrate (11) or to the substrate (10). The perimeter supports (28) may be arranged in a variety of orientations. In some exemplary embodiments the perimeter supports (28) are placed symmetrically about the edges and/or corners of the diaphragm (12). Another embodiment affixes the diaphragm (12) to the thin film substrate along the entire perimeter of the diaphragm (12). Although one illustrated embodiment employs a diaphragm (12) that is substantially rectangular, additional embodiments may employ diaphragms (12) of other geometries, including, but not limited to, circles, triangles, polygons, or substantially symmetrical or asymmetrical shapes.

FIG. 5 illustrates a cross-section of the MEMS pressure sensor incorporating diffused piezoresistors (400) of FIG. 4, according to one exemplary embodiment. FIG. 5 represents a cross-sectional view of FIG. 4 cut along the dashed line (26; FIG. 4). As illustrated, according to the embodiment of FIG. 5, a piezoresistor (20, 21) is embedded in each flexible support member (13) connecting the edges of the substrate (10) to the center support (15). However, the present exemplary pressure sensor configuration is in no way limited to including a piezoresistor in each support member (13). Rather, the number of support members and/or piezoresistors may vary significantly between embodiments.

As illustrated in FIG. 5, when incident forces or pressure waves (16) deflect the diaphragm (12) along an axis substantially perpendicular to the substrate (10), the center support (15) and the flexible support members (13) will also experience strain. The strain developed in the diaphragm is concentrated in the much smaller flexible support members (13) which include integrated piezoresistors (20, 21). Strain induced in the piezoresistors (20, 21) by the flexible support members (13) will alter the resistance of the piezoresistors (20, 21) proportional to the amount of strain induced. Consequently, a circuit may then be used to convert the resistance change of the piezoresistors (20, 21) into a strain amount, according to one exemplary embodiment. FIG. 6, detailed below is one example of a circuit that may be used to convert the resistance change to strain induced.

As mentioned, FIG. 6 illustrates an exemplary measuring circuit incorporating pressure sensitive MEMS members, according to one exemplary embodiment. As illustrated in FIG. 6, two pairs of resistances are connected in a Wheatstone bridge configuration. According to one particular embodiment, n-type piezoresistors (20) and p-type piezoresistors (21) are the resistive members. The position of the n-type piezoresistors (20) and p-type piezoresistors (21) in the circuit may be reversed provided that the left and right sides of the circuit each contain one n-type piezoresistor (20) and one p-type piezoresistor (21) and that the order of the resistances is different for each side. Since n-type piezoresistors (20) and p-type piezoresistors (21) change resistance in opposing directions while experiencing the same strain, the difference in voltage between the two output terminals (30) will be significant.

Alternately, instead of two pairs of piezoresistors, a single pair of piezoresistors may be used in the circuit with a pair of fixed resistances. Resistive members (20) could be replaced with either n-type or p-type piezoresistors and resistive members (21) could be replaced with fixed resistance members. Similarly, the fixed resistance members could be connected as resistive members (20) and the piezoresistors could be connected as resistive members (21). Also, strain gauges (18; FIG.3) may be integrated as resistive components of the circuit.

A pair of terminals (30) receives the output of the circuit. The output voltage will correlate with the strain on the resistive members as long as the strain experienced is the dominant factor determining at least one of the resistive members. According to one exemplary embodiment, a direct current voltage source (31) may be used to provide power to the Wheatstone bridge configuration. The magnitude of the bias voltage will depend on the desired range of output voltage and the components chosen for the circuit.

Figure 7:
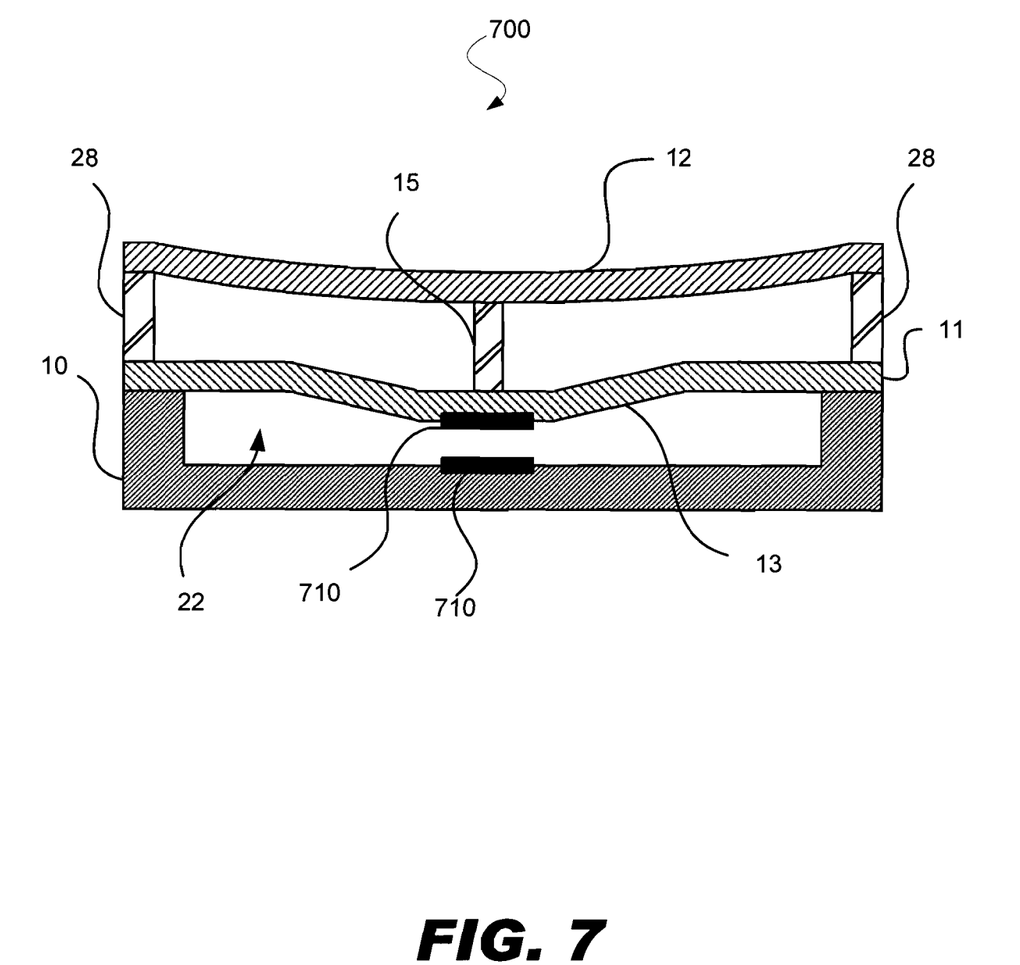
FIG. 7 is a schematic cross-sectional view illustrating an increased sensitivity MEMS pressure sensor incorporating a capacitor, according to one exemplary embodiment.

In addition to the above-mentioned strain sensing mechanisms, capacitive sensing mechanisms may also be incorporated by the present exemplary system and method. Specifically, FIG. 7 illustrates an increased sensitivity MEMS pressure sensor (700) with a capacitive sensing mechanism, according to one exemplary embodiment. Similar to the exemplary embodiments of FIGS. 2 and 5, the exemplary embodiment of FIG. 7 includes a diaphragm (12) attached to a thin film substrate (11) and substrate (10) by perimeter support members (28). As with embodiments described above, motion generated on a diaphragm (12) is transmitted through at least one motion translation support member (15) to at least one flexible support member (13).

Similar to previous exemplary embodiments, the increased sensitivity MEMS pressure sensor (700) of FIG. 7 includes a strain-sensitive member (18; FIG. 1), which in the exemplary embodiment of FIG. 7 includes at least two capacitive plates (710). As illustrated, at least one plate may be stationary while another plate may be coupled to at least one flexible support member (13). As the flexible support member (13) experiences strain caused by a received pressure source, the distance between the two capacitive plates (710) changes in response to the pressure, causing a measurable change in the capacitance of the plates. The change in capacitance of the plates (710) is a measurable indication of the strain on at least one flexible support member (13), which in turn reflects incident pressure on the diaphragm (12).

In addition to the exemplary components illustrated above, FIGS. 8A and 8B illustrate pressure equalization mechanisms for a MEMS pressure sensor, according to various exemplary embodiments. Particularly, various embodiments of the present systems and methods may be used in environments experiencing significant changes in pressure unrelated to the pressures desired to be measured. Consequently, FIGS. 8A and 8B illustrate exemplary systems that may equalize the pressure in a MEMS sensing device, when desired due to the sensing environment.

Figure 8A:
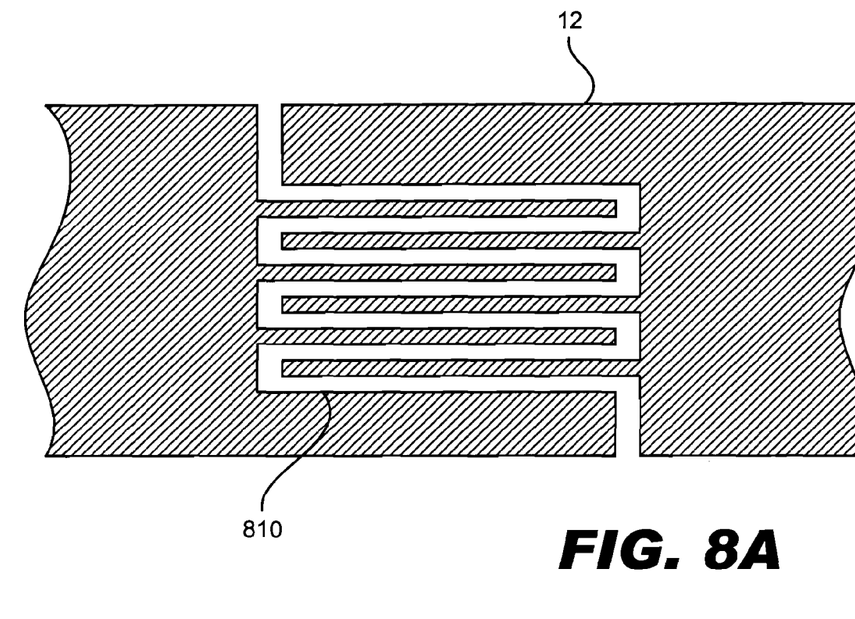
FIGS. 8A and 8B are schematic diagrams illustrating pressure equalization mechanisms for a MEMS pressure sensor, according to various exemplary embodiments.

FIG. 8A illustrates a section of a diaphragm (12) with a long serpentine equalization channel (810) through the diaphragm (12). According to one exemplary embodiment, the diameter of the channel (810) is relatively small compared to the size of the diaphragm (12) so that the equalization of pressure across the diaphragm (12) occurs slowly. As illustrated, the channel (810) may include several paths in opposing directions such that the total length of the channel (810) is much longer than the width of the diaphragm (12).

Figure 8B:
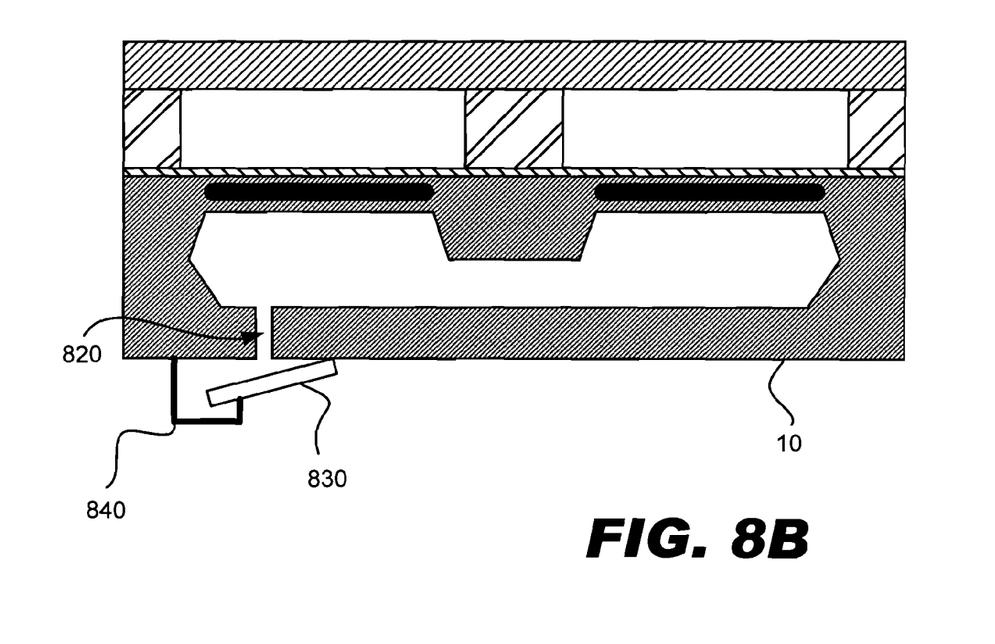

FIG. 8B illustrates another embodiment of a pressure equalization system integrated with a MEMS pressure sensor. In the exemplary embodiment of FIG. 8A, a small channel (820) provides a pressure equalization path through a substrate (10). A valve (830) may be used to selectively open or close the channel (820), activated by a valve control mechanism (840).

The present exemplary embodiments disclose a high sensitivity pressure sensor that eliminates the need for complex manufacturing processes and materials by concentrating generated strain in the vicinity of strain-sensitive devices. In particular, strain sensors are concentrated in support members and near substrate openings where the magnified strain can be measured with strain gauges, piezoresistors, and other sensors. As described above, the placement of strain-sensitive devices at locations of high stress and strain increases the sensitivity of a MEMS pressure sensor. With a suitable measuring circuit, slight variations in pressure can be clearly detected.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A micro electrical mechanical system (MEMS) pressure sensing device, comprising:
    a base structure, said base structure defining a cavity therein;
    a flexible support member spanning said cavity and attached at opposite edges of said cavity;
    a diaphragm responsive to pressure, said diaphragm being disposed on said base structure over said flexible support member;
    a motion translation support member mechanically coupling said diaphragm and said flexible support member, such that displacement of said diaphragm is translated into displacement of said flexible support member; and
    at least one stain-sensitive member configured to detect strain on said flexible support member.

2. The MEMS pressure sensing device of claim 1, wherein said diaphragm is larger than said flexible support member.

3. The MEMS pressure sensing device of claim 1, wherein said motion translation support member is disposed at a center of said diaphragm.

4. The MEMS pressure sensing device of claim 1, wherein said at least one strain-sensitive member is disposed where said flexible support member is attached at an edge of said cavity.

5. The MEMS pressure sensing device of claim 1, wherein said strain-sensitive member comprises a capacitive sensing mechanism.

6. The MEMS pressure sensing device of claim 1, wherein said flexible support member comprises members attached at four separate edges of said cavity.

7. The MEMS pressure sensing device of claim 1, wherein said strain-sensitive member measure light reflected from said flexible support member.

8. The MEMS pressure sensing device of claim 1, wherein said strain-sensitive member comprises at least one piezoresistor.

9. The MEMS pressure sensing device of claim 8, wherein said strain-sensitive member comprises at least three piezoresistors arranged with two of the piezoresistors being perpendicular to one another and a third piezoresistor disposed at an angle bisecting the angle between the perpendicular piezoresistors 10. The MEMS pressure sensing device of claim 1, further comprising a Wheatstone bridge including a plurality of resistive members, wherein at least one of said resistive members of said Wheatstone bridge includes said strain-sensitive device.

11. The MEMS pressure sensing device of claim 1, said diaphragm is supported above said base structure by a plurality of support members.

12. The MEMS pressure sensing device of claim 11, wherein said at least one strain-sensitive member is integrated in at least one of said plurality of support members.

13. The MEMS pressure sensing device of claim 1, further comprising a pressure equalizing member configured to equalize pressure on said diaphragm.

14. The MEMS pressure sensing device of claim 13, wherein said pressure equalizing member comprises one of a serpentine equalizing channel or a valve disposed in an equalizing channel.

15. The MEMS pressure sensing device of claim 1, wherein said pressure sensing device comprises a microphone.

16. The MEMS pressure sensing device of claim 1, wherein said diaphragm is disposed at an angle and not parallel to a surface of said base structure comprising said cavity.

17. A micro electrical mechanical system (MEMS) pressure sensing device, comprising:
    a base structure, said base structure defining a cavity therein;
    a flexible support member spanning said cavity and attached at opposite edges of said cavity;
    a diaphragm responsive to pressure, said diaphragm being-disposed on said base structure over said flexible support member;
    a motion translation support member mechanically coupling said diaphragm and said flexible support member, such that displacement of said diaphragm is translated into displacement of said flexible support member; and
    at least one strain-sensitive member, wherein said at least one strain-sensitive member is disposed on a stress concentration point of said flexible support member.

18. The MEMS pressure sensing device of claim 17, wherein said strain-sensitive member comprises one of a strain gauge, or piezoresistor.

19. The MEMS pressure sensing device of claim 17, wherein said strain sensitive member is configured to measure one of an electromagnetic effect an electrostrictive effect, a thermoelectric effect, a piezoelectric effect, a piezoresistive effect, an optoelectric effect, an optical effect, or an capacitive effect of strain on said device.

20. The MEMS pressure sensing device of claim 17, wherein said stress concentration point occurs where said flexible support member is attached at an edge of said cavity.

21. A method of sensing pressure with a micro electrical mechanical system (MEMS), said method comprising detecting strain on a flexible support member at a point where strain on said flexible support member is concentrated, said flexible support member spanning a cavity in a base structure and being attached at opposite edges of said cavity with a diaphragm responsive to pressure being-disposed on said base structure over said flexible support member and with a motion translation support member mechanically coupling said diaphragm and said flexible support member such that displacement of said diaphragm is translated into stain on said flexible support member.

* * * * *

UNITED STATES PATENT AND TRADEMARK OFFICE
CERTIFICATE OF CORRECTION

PATENT NO. : 7,508,040 B2  Page 1 of 1
APPLICATION NO. : 11/422243
DATED : March 24, 2009
INVENTOR(S) : Eric. L. Nikkel et al.

It is certified that error appears in the above-identified patent and that said Letters Patent is hereby corrected as shown below:

In column 9, line 51, in Claim 1, delete "stain-sensitive" and insert -- strain-sensitive --, therefor.

In column 9, line 63, in Claim 5, delete "capactive" and insert -- capacitive --, therefor.

In column 10, lines 11-12, in Claim 9, delete "piezrosistors" and insert -- piezoresistors. --, therefor.

In column 10, lines 45-46, in Claim 17, delete "being-disposed" and insert -- being disposed --, therefor.

In column 10, line 61, in Claim 19, after "effect" insert -- , --.

In column 12, line 1, in Claim 21, delete "being-disposed" and insert -- being disposed --, therefor.

In column 12, line 7, in Claim 21, delete "stain" and insert -- strain --, therefor.

Signed and Sealed this

Twenty-eighth Day of July, 2009

JOHN DOLL
*Acting Director of the United States Patent and Trademark Office*